Figure 1:
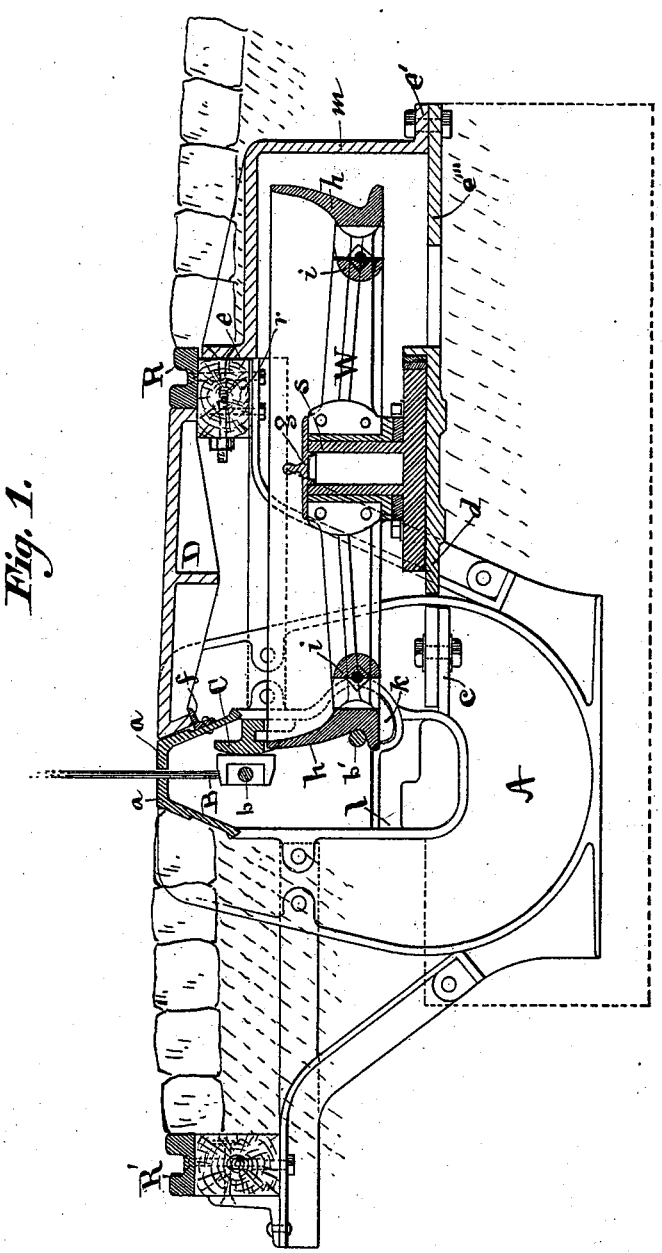

(No Model.) 3 Sheets—Sheet 1.

H. M. LANE.
CURVE PULLEY CONSTRUCTION FOR CABLE RAILWAYS.

No. 352,763. Patented Nov. 16, 1886.

WITNESSES:

INVENTOR
Henry M. Lane
ATTORNEY (No Model.) 3 Sheets—Sheet 2.
H. M. LANE.
CURVE PULLEY CONSTRUCTION FOR CABLE RAILWAYS.
No. 352,763. Patented Nov. 16, 1886.

WITNESSES: INVENTOR (No Model.) 3 Sheets—Sheet 3.

H. M. LANE.
CURVE PULLEY CONSTRUCTION FOR CABLE RAILWAYS.

No. 352,763. Patented Nov. 16, 1886.

WITNESSES:
C. W. Kerr
Emma L. Kerr

INVENTOR
Henry M. Lane
By Kerr & Hosea
ATTORNEY

UNITED STATES PATENT OFFICE.

HENRY M. LANE, OF CINCINNATI, OHIO.

CURVE-PULLEY CONSTRUCTION FOR CABLE RAILWAYS.

SPECIFICATION forming part of Letters Patent No. 352,763, dated November 16, 1886.

Application filed December 7, 1885. Serial No. 184,879. (No model.)

*To all whom it may concern:*

Be it known that I, HENRY M. LANE, a citizen of the United States, residing at Cincinnati, Ohio, have invented new and useful Improvements in Curve-Pulley Constructions for Cable Railways, of which the following is a specification.

My invention relates to horizontal-curve constructions for cable railways, its object being, primarily, to provide a construction and arrangement of the curve-pulley mechanism which shall be efficient, economical, adapted to shallow cable-tunnels, carrying the cable near to the street-surface, furnish a solid support and bearing for the inner track-rail and adjacent street-surface, and admit of the easy and expeditious removal and replacing of the curve-pulleys, and facilitate access to any one of the entire series of pulleys upon a curve for inspection, repairs, adjustment, &c.

To this end, and incidentally to secure other advantages which will more fully appear, my invention consists, first, in a peculiar construction of a cast yoke for supporting the tunnel-irons, track, and the bearings for the curve-pulleys upon curves; second, in a peculiar construction and arrangement of the curve-pulley bearings between and upon contiguous tunnel-supporting yokes; third, in a shallow receptacle or pulley-casing with removable cover adjacent to and opening into the cable-tunnel, and extending laterally beneath the inner track-rail stringer, said casing constituting a support for said stringer; fourth, in the construction and arrangement of a continuous open curve-pulley tunnel-casing adjacent to the cable-tunnel and opening into the same, adapted to receive a series of adjacent pulleys with abutting removable covers constituting the street-surface over said tunnel; fifth, in the construction and arrangement of a base-plate or support for the curve-pulleys adapted to be secured upon and between contiguous tunnel-supporting yokes; sixth, in the construction and arrangement of an outer casing for the curve-pulley adapted to connect and secure the inner track-rail stringer to the curve-pulley base-plate, forming also a prop or supporting-column for the inner track-rail and adjacent street-surface, and utilizing the pulley base-plate as a base for said prop.

Figure 2:
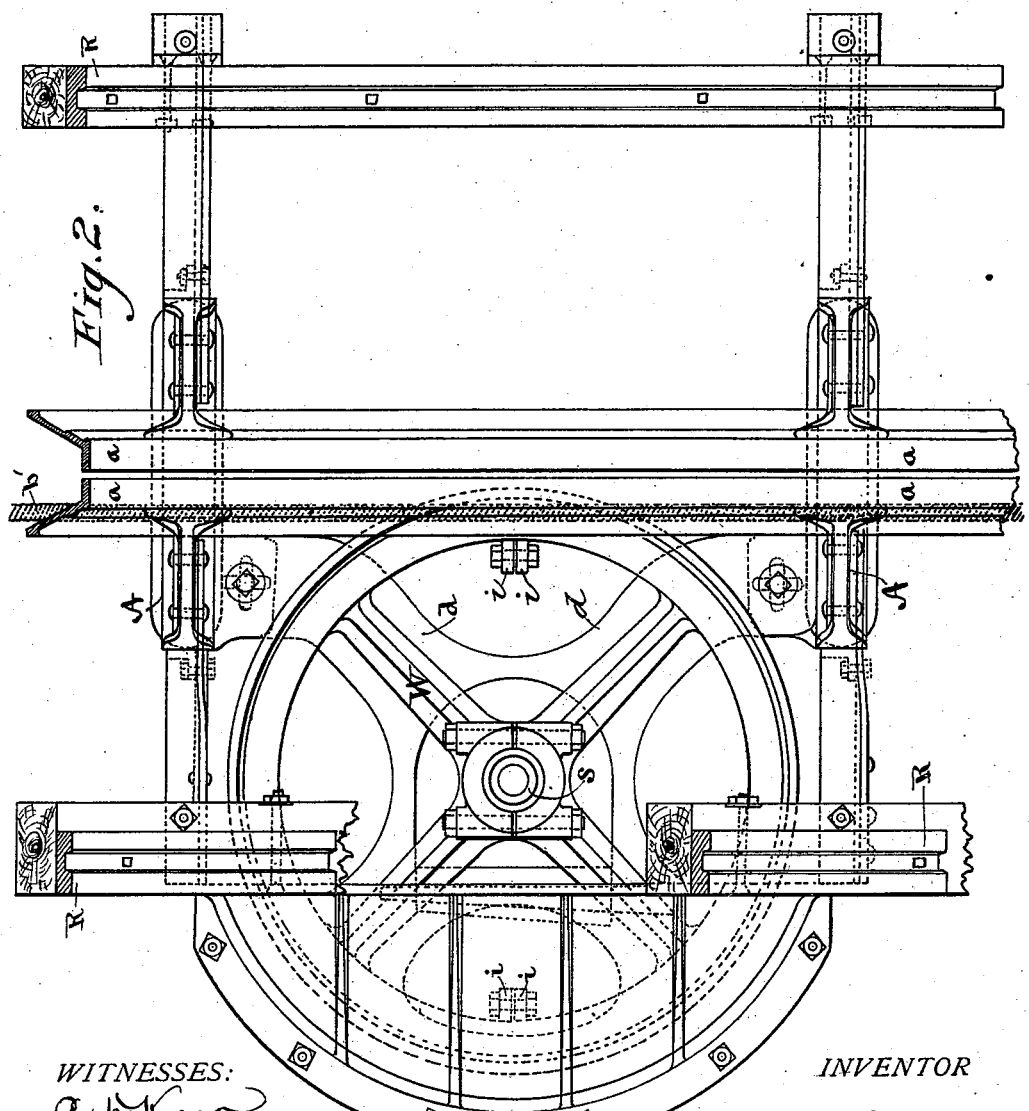
Figure 3:
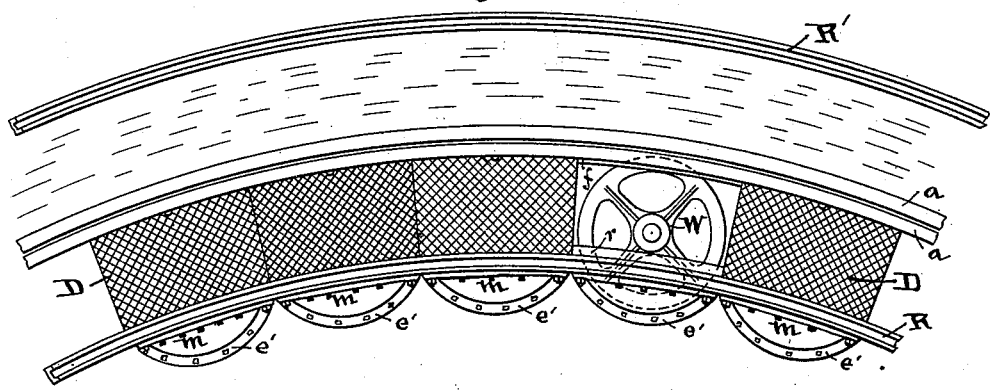
Figures 4, 7:
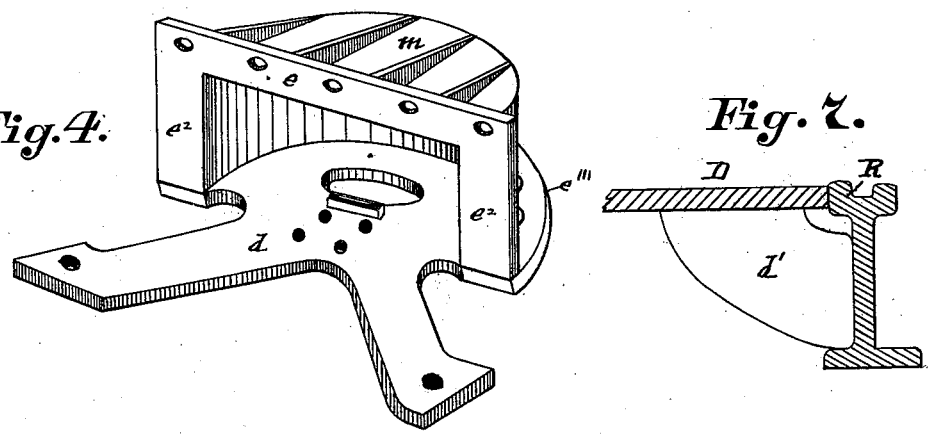
Figure 5:
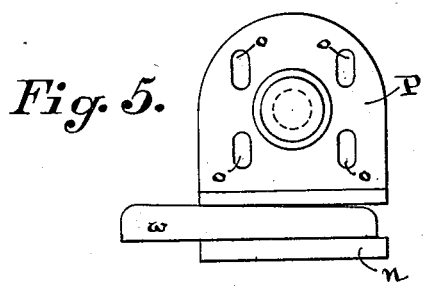
Figure 6:
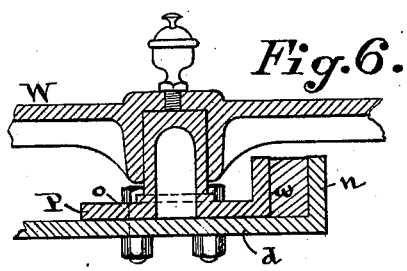

Mechanism embodying my invention is illustrated in the accompanying drawings, in which Figure 1 is a vertical section of the cable-tunnel, guard-rail, track-rails, and curve-pulley casing, taken axially through the horizontal pulley and pulley-casing; Fig. 2, a plan view of the same. Fig. 3 is a plan view of an extended portion of the curve, showing the abutting covers of the pulley-casings (one cover being removed) and the outer sides of the pulley-casings, constituting, in the aggregate, the general outer casing of the curve-pulley tunnel; Fig. 4, a perspective view of the base-plate or support of the curve-pulley with the outer casing attached; Fig. 5, a plan view of the adjustable stud-plate; Fig. 6, a detail vertical axial section through the pulley-stud plate and base-plate, and Fig. 7 a detail section of the removable cover as applied to a T-rail having no "stringer."

Referring now to the drawings, A designates one of the yokes for maintaining the slot-rails $a\ a$ in position; B, the "grip-iron" traveling in the slot and attached to the car; $b$, the cable in position in the grip; $b'$, the cable released from the grip and in position against the wheel; W, the horizontally-arranged pulley, (which may be one of a series where a number are employed on a curve;) C, a guard-rail to take the lateral strains of the cable upon the grip-iron, and R R' the main-track rails.

The track and slot rails are shown in Fig. 2 as straight; but it will be understood that in practice they are curved, the arc of curvature being, however, so large as to be practically indistinguishable from a right line for the distance shown in the drawings.

The general construction of the yoke and its track-supporting brackets I have described in another pending application, No. 158,297, filed March 10, 1885. The construction here shown is substantially the same, excepting as specified. At the side adjacent to the wheels W the bracket for sustaining the track-rail R is located somewhat higher than its normal position on the ordinary yokes, in order to allow space below the rail-stringer $r$ for the operation of the pulley W. The yoke A is also cast with a flange, $c$, at one side, for the attachment of the stud-plate or spider $d$, constituting the bottom of the pulley-boxing and the support of the wheel-pivot $s$.

In Fig. 2 the spider is shown secured to its position upon the flanges of two adjacent yokes, A, and in Fig. 4 attached to the outer portion of the pulley-casing. It consists, substantially, of a flat casting, preferably in the form of a spider having four radial arms, two of which engage upon the flanges of contiguous yokes, the other two extending outward beneath the stringer $r$ and the track-rail R, and merging in an arc-shaped plate, $e^4$. The inner end of the spider adjacent to the cable-tunnel is upheld by engagement with the yokes, and is bolted upon the flanges $c$, before described. The outer end of the same is upheld by a practically cylindrical covering, $m$, with flanged edges, by which it is bolted horizontally to the rail-stringer $r$ by means of its straight vertical flange $e$, and also bolted vertically to the outer rim of the spider by a correspondingly-curved horizontal flange, $e'$. The remaining upper opening of what may be called the "boxing" of the wheel, extending between the cable-tunnel on one side to the track-stringer $r$ on the other, is closed by a removable cover, D, fitted between the track-rail R and the tunnel-iron $a$, resting at the rail side upon the rail-stringer $r$, and at the tunnel side upon a bracket, $f$, bolted to the side of the tunnel-iron $a$. The pulley W is supported upon a fixed pivot or stud, $s$, rising from an adjustable plate secured at the center of the spider $d$.

In Fig. 1 the stud $s$ is shown as hollow and provided with a removable cover, $g$, the purpose being to utilize the same as an oil-receptacle, suitable holes being drilled through at the base of the reservoir to allow the oil to feed; but the preferred construction is exhibited in Fig. 6, in which the stud is either solid or closed at the top, and the wheel-aperture extends only part way through its hub, whereby the wheel is carried and supported entirely on the stud $s$, raised above the base of the latter—a construction which prevents access of dirt, to which the position of the wheel at the bottom of its casing would otherwise expose it. The pulley-stud is carried upon an adjustable plate, P, provided with elongated bolt-holes $o$, and is adjusted by this means against an abutment, $n$, cast upon the spider $d$, with an interposed adjusting-wedge, $w$, which may be of wood or metal.

The pulley is cast in detachable parts, preferably two in number, dividing the wheel diametrically, and bolted together through corresponding flanges, $i$, projecting inwardly from the rim of the pulley, a similar bolt-connection being made at the hub. The outer rim of the wheel is cast somewhat flaring above, with a groove at the bottom of the flare, the cross-section of the rim being, as shown at $h$, Fig. 1, somewhat approximating a longitudinal section of the human foot with a high heel. The guide-rail C is cast in sections bolted to the inner side of the yokes, as shown, and is in cross-section a T-formed rail with a vertically-curved outer surface and a downwardly-projecting base-flange for bolting to the yokes.

When in position, the guide-rail C follows a curve parallel with the slot-opening, and at proper intervals between the yokes its under surface is recessed to allow the pulleys W to revolve within the recesses flush with the outer surface of the guide-rail. The two positions of the cable in and out of engagement with the grip are indicated in Fig. 1 at $b\ b'$. In its intermediate positions it bears against the outer periphery of the pulley between the points indicated.

The curve-yokes A are formed with an inner recess, $k$, (indicated in Fig. 1 partially by dotted lines,) to avoid contact of the cable upon the intermediate yokes, in the event of the temporary removal of one wheel, W, of a series, and are also formed with a cross-bar, $l$, connecting the yoke-jaws approximately at the height of the peripheral pulley-grooves to furnish a guide surface to insure the original seating of the cable in the grooves, and its reseating in case of displacement thereafter. This cross-bar $l$ also serves to strengthen the yoke, thus maintaining the integrity of the slot-opening, and without practically elevating the inner bottom of the yoke so as to interfere with the drainage of the bottom of the tunnel, which practically coincides with the yoke-bottoms, a sufficient opening being left beneath the bar $l$ for the purpose.

No under support is required for the wheel-boxing other than a concrete or other solid filling, which may be inserted and rammed through the openings of the spider $d$ by means of the covered access-opening at the top. The pulley W may be inserted and removed through the top-covered opening in sections by removing and replacing its fastening-bolts.

In aggregating a series of pulleys upon a curve, Fig. 3, the outer casings, $m$, are secured, abutting each other to the stringer $r$. The face of each casing, or, more properly, the top and side flanges, $e$ and $e^2\ e^2$, as will readily be seen, Fig. 4, constitute a bridge, by which the stringer is firmly upheld upon the plate or spider $d$ as an enlarged base. The stringer $r$ and the covers D, constituting the street-surface, are thus supported with extraordinary strength upon a broad base by very simple and efficient means, and the integrity of the track alignment, which is of far more importance upon a curve than elsewhere, is thus preserved intact. Again, the covers D, which are made in segmental form, have their bearings upon their longer sides upon the ledges formed by the bracket $f$, secured upon the tunnel-iron $a$ and the top of the stringer $r$, said stringer being made wide enough for the purpose. Linearly they are simply butted together without further support. By this arrangement I utilize parts already existing for the support of the covers and avoid the permanent cross-bars ordinarily employed for supporting the covers at their ends, and obtain this additional and very important advantage—that is, when the covers are all removed there exists a continuous and entirely free access-opening for the entire cavity in which the curve-pulleys operate, which facilitates construction, repairs, inspection, and cleaning to an important degree.

The extreme ends of the pulley-cavity are boarded or walled up in any convenient manner, the outer side being walled by the aggregated casings m. It will also be observed that as the pulley-cavity opens at one side into the cable-tunnel, and as the bottom of the latter (which is provided with suitable drainage connections) is at a lower level than the bottom of the pulley-cavity, the cable-tunnel forms a conduit for any water which might enter the pulley-cavity.

Where, as illustrated in Fig. 7, a T-rail is employed for the track, the cover D may be cast with suitable down-projecting lugs, $d'$, to rest against the vertical web and bottom flange of the rail as a substitute for the ledge-bearing formed by the stringer $r$ in the construction described. The vertical flange $e$ of the casing $m$ will also in such case be made to conform to the rail.

I claim as my invention and desire to secure by Letters Patent of the United States—

1. In cable-railway curve constructions, a shallow box-receptacle for the horizontal curve-pulley extending laterally from the tunnel beneath and beyond the inner track-rail, between and supported by two contiguous tunnel-yokes, and provided with a removable cover, substantially as set forth.

2. In cable-railway curve constructions, a bottom plate or support for the horizontal pulleys, consisting substantially of a stud-plate or spider resting upon and supported by contiguous tunnel-yokes at the tunnel side, and connected by a partial cover or boxing with the track-stringer at the outer side of said bottom plate, substantially as set forth.

3. The combination, in cable-railway curve constructions, of two tunnel-supporting yokes provided with side brackets for rail-supports, a supporting-plate for the curve-pulley secured to said yokes, and an approximately-horizontal cable-pulley pivotally mounted on said plate between the yokes, substantially as set forth.

4. In cable-railway constructions, a cast yoke for supporting the tunnel on horizontal curves of the line, provided with a lateral inner recess, K, substantially as set forth.

5. In cable-railway curve constructions embodying a pulley-casing opening between the cable-tunnel iron and the track-stringer, a supporting-bracket upon the tunnel-iron, in combination with an inward extension of the inner track-stringer forming side supports for a removable cover, substantially as set forth.

6. In cable-railway curve constructions, a pulley-support and casing for the horizontal curve-pulleys of a size approximately just sufficient to contain the pulley, consisting of a bottom plate secured to contiguous yokes and extending beneath and beyond the inner track-stringer, an outer part cover or boxing secured to the stringer and supporting the bottom plate, and a removable cover or top plate adjusted between the track-rail and the tunnel-iron.

7. In cable-railway constructions, a continuous tunnel-casing for a series of curve-pulleys, entirely open above throughout, between the inner track-stringer and the cable-tunnel, provided with abutting removable covers having their resting-supports solely upon a bracket secured upon the cable-tunnel iron at one side and the inner track-stringer at the other, substantially as set forth.

8. In cable-railway curve constructions, a part-casing constituting the outer wall of the curve-pulley boxing, constructed with marginal flanges at the sides and top of the opening, the top flange adapted to secure the said part-casing against the rail or rail-stringer, and the side flanges extending downward as supporting-columns for the same to rest upon the bottom plate of the pulley-boxing, substantially as set forth.

9. In cable-railway curve constructions, in combination with the cable-tunnel iron and the inner rail or track stringer, forming parts of the walls of a continuous open cavity for the operation of the horizontal curve-pulleys, and a series of removable covers resting upon side bearings formed by the cable-tunnel and said rail or track stringer, a series of individual part-casings, each constituting the outer boxing of its pulley and attached to and forming a series of supports for the rail or track stringer upon the base or stud plates of the pulleys, substantially as set forth.

10. The combination of the pulley W and base-plate $d$, having an abutment, $n$, with the stud-plate P, wedge $w$, and bolt-connections, substantially as set forth.

11. The combination of a guard-rail, $c$, recessed at the under side, with an approximately-horizontal curve-pulley adjusted to play in such recess flush with the general face of the rail, substantially as and for the purpose set forth.

In testimony whereof I have hereunto set my hand in the presence of two subscribing witnesses.

HENRY M. LANE.

Witnesses:
L. M. HOSEA,
C. D. KERR.